United States Patent

Hoyler

[15] 3,667,082
[45] June 6, 1972

[54] LIGHT FOR AUTOMOTIVE VEHICLES AND WIPER THEREFOR

[72] Inventor: Alfred Hoyler, Stuttgart, Germany
[73] Assignee: Robert Bosch GmbH, Stuttgart, Germany
[22] Filed: Feb. 16, 1971
[21] Appl. No.: 115,785

Related U.S. Application Data

[62] Division of Ser. No. 752,204, Aug. 13, 1968, abandoned.

[30] Foreign Application Priority Data

Sept. 2, 1967 Germany...............................B 94281
Oct. 19, 1967 Germany...............................B 95035

[52] U.S. Cl......................15/250.02, 15/250.17, 15/250.19, 15/250.24, 15/250.29
[51] Int. Cl.......................B60s 1/06, B60s 1/14, B60s 1/20
[58] Field of Search....................15/250.16, 250.17, 250.19, 15/250.24, 250.25, 250.29, 250.02

[56] References Cited

UNITED STATES PATENTS

| | | | |
|---|---|---|---|
| 1,431,357 | 10/1922 | Benkiser | 15/250.19 |
| 1,431,934 | 10/1922 | De Marco | 15/250.19 |
| 2,264,465 | 12/1941 | Vollett | 15/250.19 |
| 2,880,444 | 4/1959 | Barenyi et al | 15/250.29 |
| 3,158,935 | 12/1964 | Rosenthal | 15/250.29 X |

FOREIGN PATENTS OR APPLICATIONS 676,967  12/1963  Canada...............................15/250.01

Primary Examiner—Peter Feldman
Attorney—Michael S. Striker

[57] ABSTRACT

The headlights of an automotive vehicle are provided with wipers having elongated flexible wiping elements which are reciprocable along the outer sides of the respective lenses toward and away from a parking position in which they are concealed behind the moulding rings of the headlights. Sprinklers are provided to spray water onto the lenses, at least during a portion of reciprocatory movement of the wiping elements. The operation of the drives for the wiping elements and of pumps for the sprinklers is regulated by electric programming circuits.

10 Claims, 14 Drawing Figures

INVENTOR
Alfred HOYLER
BY his ATTORNEY

INVENTOR
Alfred HOYLER

BY his ATTORNEY

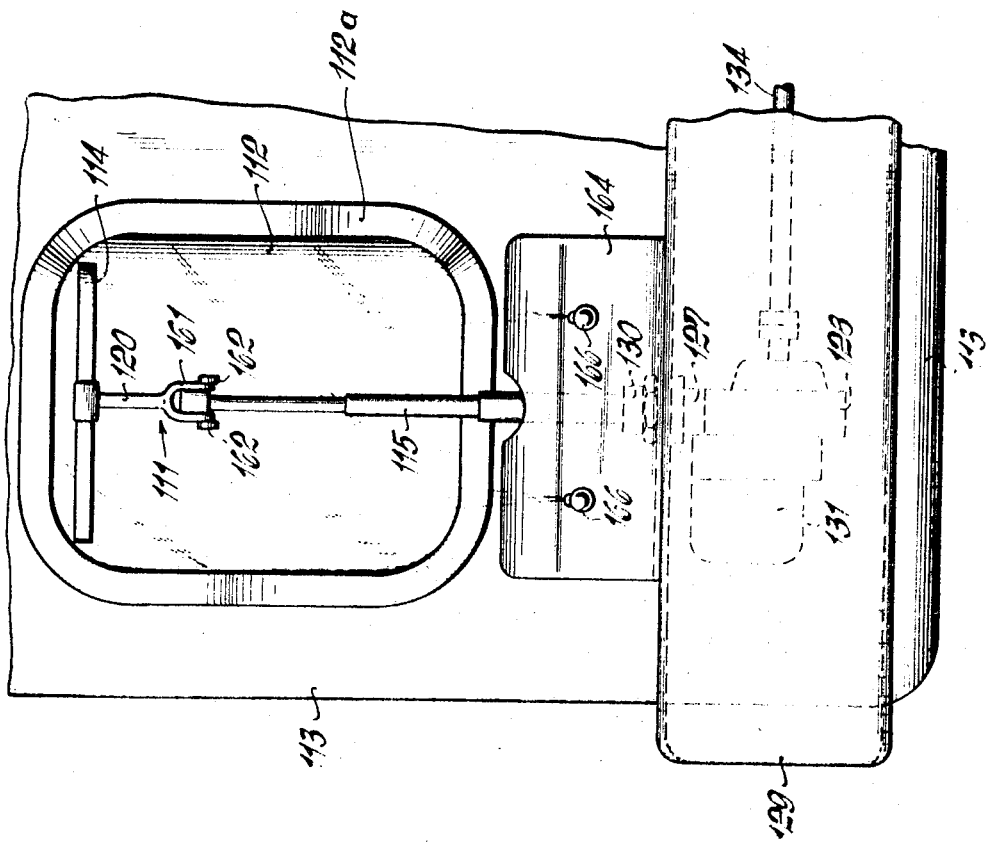
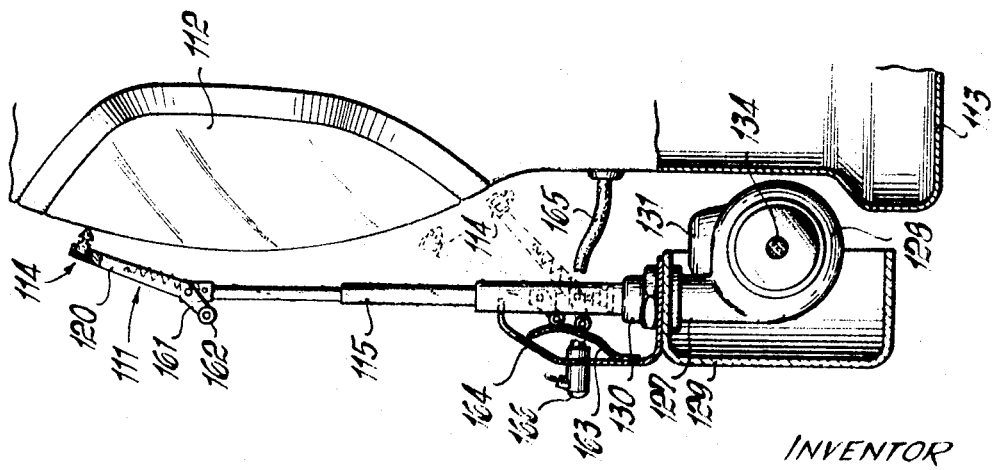
INVENTOR
Alfred HOYLER
BY
his ATTORNEY

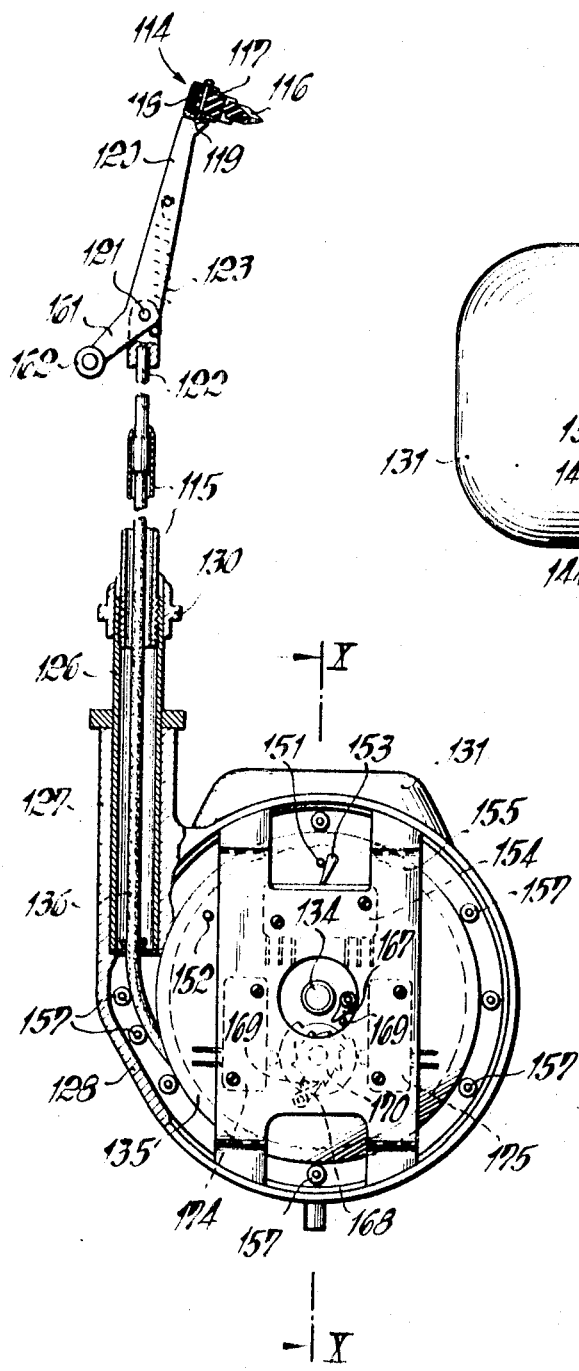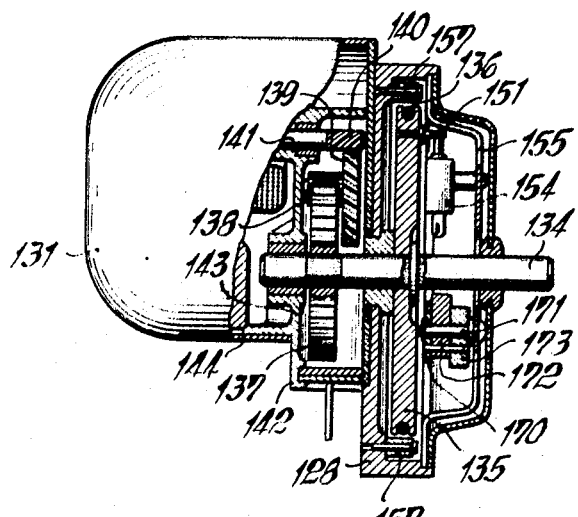

FIG. 13
FIG. 11
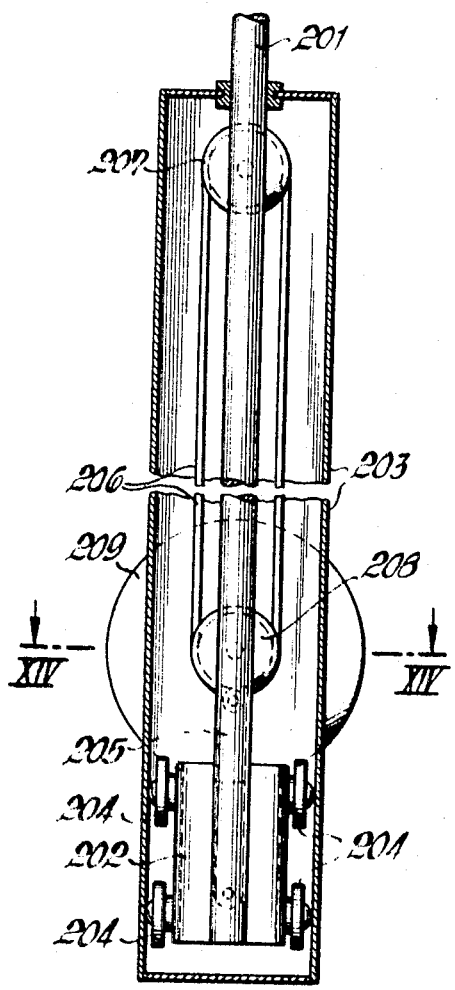
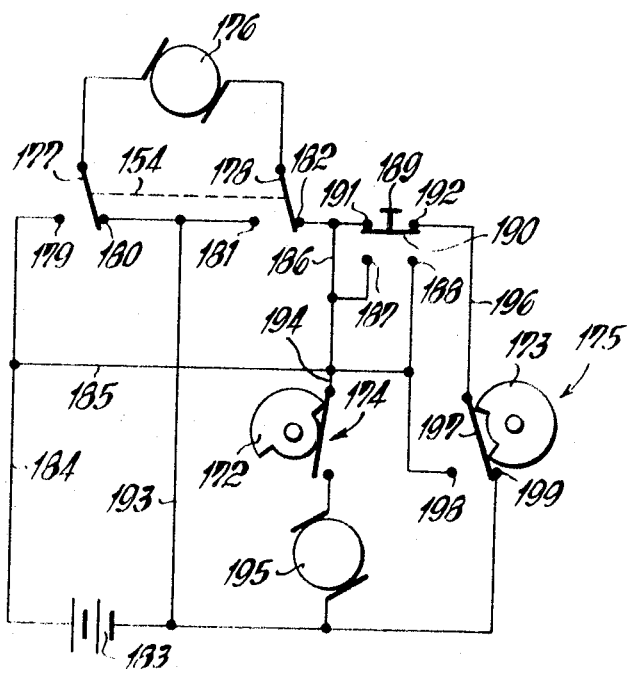
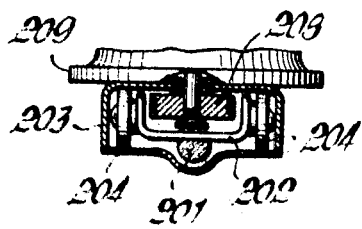
FIG. 14
INVENTOR
Alfred HOYLER

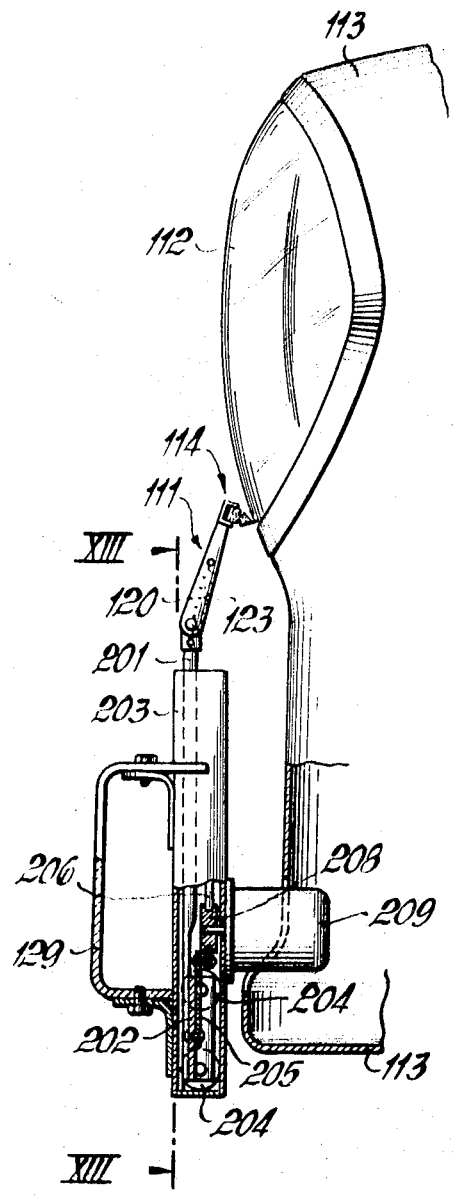

3,667,082

LIGHT FOR AUTOMOTIVE VEHICLES AND WIPER THEREFOR

CROSS-REFERENCE TO RELATED APPLICATION

This is a division of my copending application Ser. No. 752,204 filed Aug. 13, 1968, now abandoned.

BACKGROUND OF THE INVENTION

The present invention relates to lights for automotive vehicles. More particularly, the invention relates to improvements in lights which are combined with or embody wipers for their lenses.

In presently known headlights which are provided with wipers, the blades of the wiper extends in front of the lens and each of its ends is connected to an endless band or belt. These belts are mounted in planes which are parallel to the axis of the light and each thereof is trained around three rollers two of which are located in front of the lens and the third of which is mounted behind the reflector. The two rear rolls are mounted on the shaft of a motor which drives the bands in predetermined direction so that each wiper blade travels along the front side of the respective lens, thereupon around the light and back to the front side of the lens. A serious drawback of such wipers is that they require a frame for the rolls of the bands. The frame surrounds the light and occupies too much space which is undesirable, especially when the wiper is employed in connection with a headlight which is built into the body of the vehicle.

SUMMARY OF THE INVENTION

One of the objects of my present invention is to provide a light for automotive vehicles with a simple and compact wiper.

Another object of the invention is to provide a novel wiper which can be utilized on headlights or other lights of automotive vehicles.

A further object of the invention is to provide a light, particularly a headlight, with a wiper which is mounted entirely in front of the lens and which need not travel beyond the outlines of the lens.

Still another object of the invention is to provide the light with a wiper and with a device which can sprinkle a liquid onto the outer side of the lens prior to and/or during wiping.

An ancillary object of the instant invention is to provide a wiper which is fully or nearly fully concealed when not in use.

A concomitant object of the invention is to provide a wiper which automatically assumes a concealed parking position when it is not in use.

A further object of the invention is to provide a wiper for headlights of automotive vehicles which can be driven by hand or by a motor and which is equally suited for cleaning of smooth as well as for cleaning of grooved or otherwise ornamented outer sides of lenses in headlights or the like.

Another object of the invention is to provide a wiper which can be combined with or installed on conventional headlights for automotive vehicles or the like.

An additional object of the invention is to provide a wiper which comprises a relatively small number of simple parts and whose operation requires a minimal effort or small amounts of electrical or other energy.

The invention is embodied in a light, particularly a headlight, for use in conveyances, especially in automotive vehicles. The light comprises a lens, a wiper having an elongated flexible wiping element which is reciprocable along the outer side of the lens between spaced first and second end positions in the latter of which the wiping element is preferably concealed behind the moulding ring of the light, drive means operative to move the wiping element between the two end positions, and locating means for automatically maintaining the wiping element in the second end position when the drive means is idle.

The drive means may comprise a flexible driving member which is operatively connected with the wiper. Such flexible element may include an endless toothed belt which is trained over toothed supporting rollers or gears and is connected to a reciprocable carriage of the wiper by way of a link which converts unidirectional movement of the belt into reciprocatory movement of the carriage. The latter supports the wiping element. The drive means may also comprise a drawstring which is biased to a given position by a resilient locating member and which can be pulled by hand from the driver's seat. An intermediate portion of such drawstring is connected to the aforementioned carriage which is preferably guided in the compartment of an elongated box-shaped guide means or frame. A portion of such frame can be defined by a suitably configurated part of the lens. In accordance with a further embodiment of the invention, the drive means may comprise an elongated cable which is capable of pulling or pushing the wiping element and which is connected to a pulley. The latter is rotated by a reversible electric motor which is controlled by an electric programming circuit a portion of which is mounted on and shares the movements of the pulley.

The novel features which are considered as characteristic of the invention are set forth in particular in the appended claims. The improved light itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 7 is a side elevational view of a sixth light wherein the wiping element of the wiper is movable up and down;

FIG. 8 is a front elevational view of the light shown in FIG. 7;

FIG. 9 is an enlarged view of a detail in the light of FIG. 7, with certain parts illustrated in vertical section;

FIG. 10 is a vertical sectional view as seen in the direction of arrows from the line X—X of FIG. 9;

FIG. 11 is a diagram showing the electric programming circuit for the wiper and sprinkler in the light of FIGS. 7 to 10;

FIG. 12 is a fragmentary side elevational view of a seventh light;

FIG. 13 is an enlarged sectional view as seen in the direction of arrows from the line XIII—XIII of FIG. 12; and FIG. 14 is a sectional view as seen in the direction of arrows form the line XIV—XIV of FIG. 13.

DESCRIPTION OF THE PREFERRED EMBODIMENTS

Figure 1:
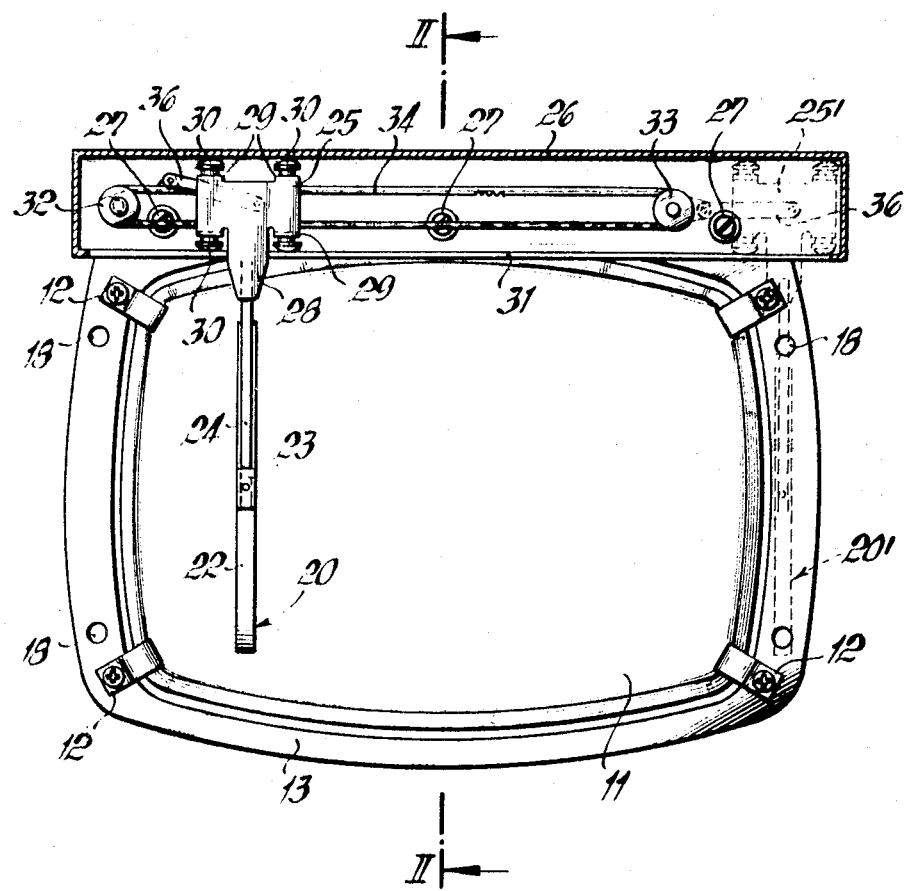
FIG. 1 is a front elevational view of a headlight for an automotive vehicle which embodies one form of the invention, the guide means for the carriage of a wiper being shown in vertical section substantially as seen in the direction of arrows from the line I—I of FIG. 2.
Figure 2:
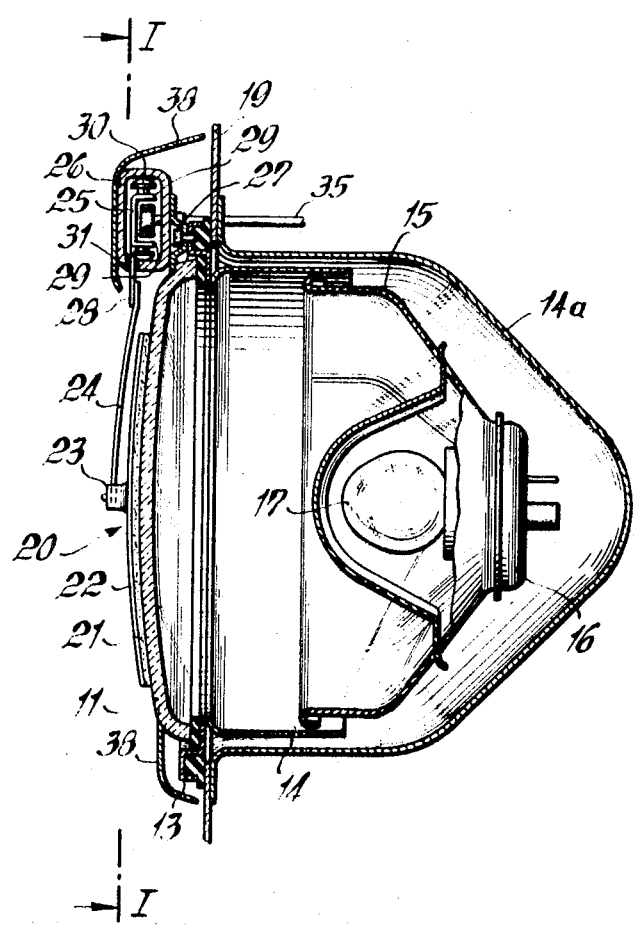
FIG. 2 is a transverse vertical sectional view as seen in the direction of arrows from the line II—II of FIG. 1.

Referring first to FIGS. 1 and 2, there is shown a headlight for an automotive vehicle. This headlight comprises a lens 11 which is fixedly mounted in a rim 13 by lugs 12. The rim 13 is fixed to a sleeve 14 which accommodates the front portion of a reflector 15 having a socket 16 for a lamp 17. The means for moving the reflector 15 with reference to the sleeve 14 for the purpose of focusing is not shown in FIGS. 1 and 2. The rim 13 is formed with holes 18 which accommodate portions of screws or analogous fasteners (not shown) for securing the rim to the frame or chassis 19 of the vehicle. This chassis also supports a housing 14a which accommodates the sleeve 14 and the reflector 15.

The headlight is further provided with a wiper which includes an elongated wiping element 20 located at the outer side of the lines 11. The wiping element 20 includes an elongated blade 21 of rubber or analogous elastic material and an elongated rail 22 which holds the rear marginal portion or bead of the blade 21. The rail 22 preferably consists of steel and its median portion is connected to an elastic wiper arm 24 by a coupling 23. The arm 24 is stressed in such a way that it biases the lip of the blade 21 against the outer side of the lens 11. The wiper further comprises a slide or carriage 25 which supports the wiper arm 24 and is reciprocated along an elongated guide means here shown as a hollow box-shaped frame 26 which is mounted in parallelism with the upper edge portion of the lens 11. The frame or guide means 26 is secured to the rim 13 by three screws 27 or analogous fasteners.

The carriage 25 preferably consists of sheet metal and is provided with a downwardly projecting extension 28 which supports the upper end portion of the elastic wiper arm 24. The carriage 25 further comprises four bent-over legs or brackets 29 each of which carries a roll 30. These rolls 30 are rotatable about two vertical axes.

The bottom wall of the frame 26 is formed with an elongated slot 31 for the extension 28 of the carriage 25. The diameters of the rolls 30 are somewhat smaller than the width of the compartment in the frame 26 so that the periphery of each of the rolls 30 merely engages one side wall of the frame, namely, the front wall or the rear wall. In this way, the carriage 25 is free to travel back and forth in the frame 26 with a minimum of friction but is still held against tilting about a vertical axis which is located in the plane of FIG. 1. The rolls 30 provided with convex end faces which can abut against the top or bottom wall of the frame 26 to thus prevent tilting of the carriage 25 about a horizontal axis making a right angle with the plane of FIG. 1.

The drive means for reciprocating the carriage 25 and the parts 21–24 of the wiper back and forth along the outer side of the lens 11 comprises two toothed rollers or gears 32, 33 which are mounted in the frame 26 and an endless flexible element 34, here shown as a toothed belt, which is trained around the rollers 32, 33. The drive means further comprises an electric motor (not shown) or an analogous prime mover whose flexible output shaft 35 is drivingly connected with the roller 32 so as to drive the toothed belt 34 in a single predetermined direction. For example, the shaft 35 can drive the roller 32 in a counterclockwise direction, as viewed in FIG. 1. The just mentioned prime mover is preferably arranged to drive the carriages 25 of two wipers, namely, of the wiper shown in FIG. 1 and of a second wiper which serves to clean the outer side of the lens in a second headlight (not shown). The drive means also comprises a coupling element 36 here shown as a link which is articulately connected with the toothed belt 34 and with the carriage 25 and causes the carriage to move the blade 21 between two spaced end positions in response to unidirectional rotation of the roller 32. Thus, the link 36 converts unidirectional movement of the belt 34 into reciprocatory movement of the carriage 25.

The headlight of FIGS. 1 and 2 further comprises a customary decorative moulding ring 38 which overlies the edge portions of the lens 11 (see FIG. 2) and the guide means or frame 26 for the carriage 25. The moulding ring 38 is affixed to the rim 13 and/or to the chassis 19. The headlight is also provided with a locating or positioning device (not shown in FIGS. 1 and 2) which automatically maintains the parts 21–24 in the phantom line parking positions (denoted in FIG. 1 by the numeral 20') when the motor which drives the shaft 35 is idle. The blade 21, its rail 22, the coupling 23 and the wiper arm 24 are then fully concealed by the moulding ring 38 and are adjacent to one of the two vertical edge portions of the lens 11. The corresponding portion of the moulding ring 38 is configurated in such a way that it fully conceals the parts 21–24 in the positions 20'.

The motor which drives the output shaft 35 can be started in response to closing of a manually operated master switch or starter switch (not shown) which is preferably mounted on the dashboard. The aforementioned locating device for the wiper preferably includes a second switch which is connected in parallel with the master switch and is actuated by a trip provided on or connected to the carriage 25. Such sircuits are known per se. When the motor is started, its shaft 35 drives the roller 32 in a counterclockwise direction, as viewed in FIG. 1, whereby the roller 32 drives the belt 34 and roller 33 so that the belt 34 either drags or pushes the link 36 and the latter causes the carriage 25 to travel between a first end position adjacent to the left-hand portion of the lens 11 and the second end position or parking position 25' of FIG. 1. When the master switch 20 is released by the driver of the vehicle, it opens automatically whereby the second switch insures that the motor comes to a halt when the carriage 25 assumes the parking position 25' so that the blade 21 is concealed at the right-hand edge portion of the lens 11.

An important advantage of the wiper shown in FIGS. 1 and 2 is that the means for supporting it for movement along the outer side of the lens 11 need not extend behind or along the sides of the light proper. This is achieved by mounting the wiper for reciprocatory movement in contrast to the movement along an endless path which is necessary in aforediscussed conventional wiper and light assemblies. The wiping element 20 could be mounted in two carriages, i.e., in the carriage 25 and in a second carriage which would travel back and forth along the lower edge portion of the lens 11 in synchronism with the carriage 25. However, the construction shown in FIGS. 1 and 2 is preferred at this time because it comprises fewer parts and occupies less room. It is also possible to replace the toothed belt 34 with an endless cord or with a smooth belt; however, the toothed belt is preferred at the present time because it can be driven without any slippage.

The frame 26 preferably accommodates or carries one or more sealing strips (not shown) extending along the slot 31 to prevent entry of dust or moisture. Such lip or lips can be deflected by the carriage 25 during movement back and forth in the compartment of the frame 26.

The operation of the motor which drives the toothed belt 34 can be controlled by a programming unit a portion of which travels with the belt or shares angular movements of the roller 32 or 33. Such programming unit can automatically arrest the motor when the wiping element 21 completes a predetermined number of strokes; it can also control the operation of a sprinkler. A somewhat different programming unit will be described in connection with FIGS. 7 to 11.

Figure 3:
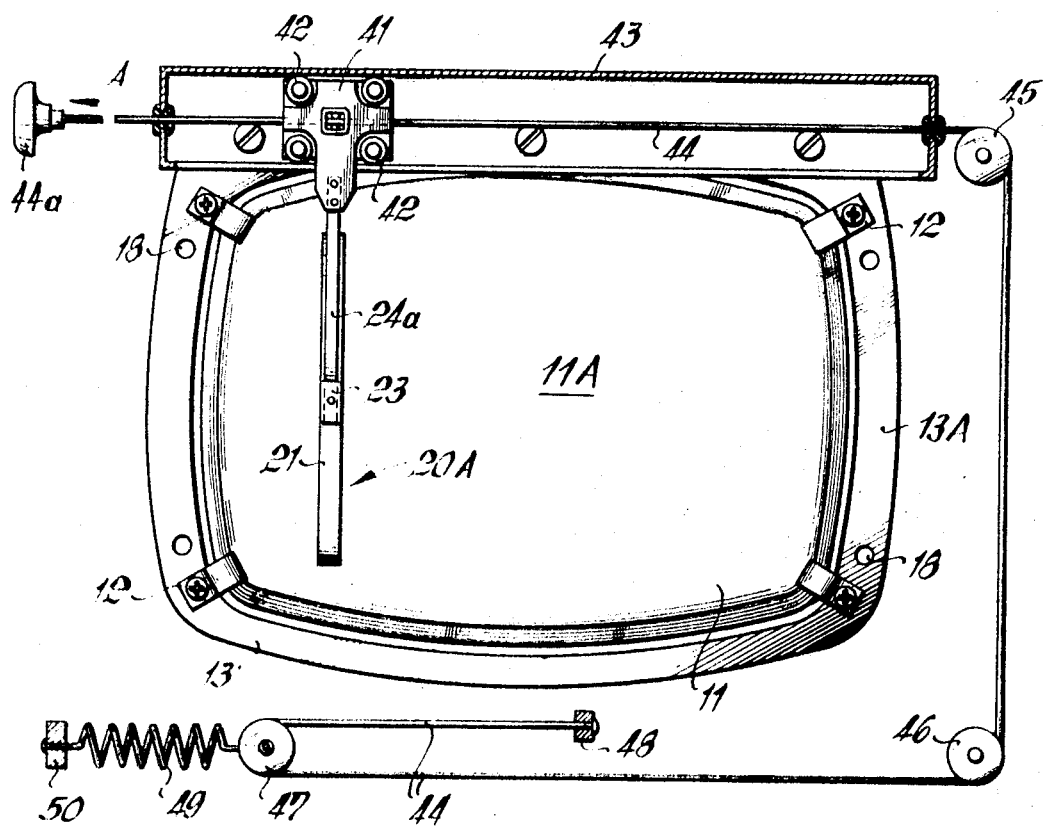
FIG. 3 is a fragmentary partly front elevational and partly vertical sectional view of a second light wherein the wiper is operated by hand.

FIG. 3 illustrates a simplified headlight wherein the wiper again comprises an elastic arm 24A which is connected to and shares reciprocatory movements of a carriage 41 having wheels or rolls 42 which are guided by a box-shaped frame 43 extending along and secured to the upper portion of the rim 13A. The lens 11A is mounted in the same way as described in connection with FIGS. 1 and 2. The drive means for the carriage 41 and wiping element 20A is operated manually and comprises an elongated flexible element here shown as a drawstring 44 lengthwise through the frame 43 and having an intermediate portion affixed to the carriage 41. The left-hand end portion of the drawstring 44 is provided with a manually operated knob or handle 44a which is mounted on the dashboard of the vehicle and is within reach of the driver's hand. The other end portion of the drawstring 44 is affixed to a stationary retainer 48 provided in the chassis of the vehicle. The drawstring is trained around two fixed idler rollers 45, 46 and around a third roller 47 which is connected to one end of a helical spring 49. The other end of the spring 49 is anchored in a fixed retainer 50. This spring serves as a locating means for automatically maintaining the wiping element 20A in a second end position or parking position (corresponding to the phantom-line parking position 20' of FIG. 1) in which the wiping element 20A is concealed along one edge portion of the lens 11A by being located behind the moulding ring (not shown). When the driver wishes to clean the outer side of the lens 11A, he or she exerts on the drawstring 44 a pull in the direction indicated by arrow A whereby the drawstring advances the carriage 41 of the wiper from the parking position toward a first end position adjacent to the left-hand edge portion of the lens. When the knob 44a is released, the spring 49 dissipates energy and returns the wiping element 20A to parking position. The purpose of the roller 47 is to insure that the difference between the lengths of the spring 49 in fully expanded and fully contracted positions is only half the distance between the end positions of the carriage 41. The parts 44–48 constitute a simple tackle.

Figure 4:
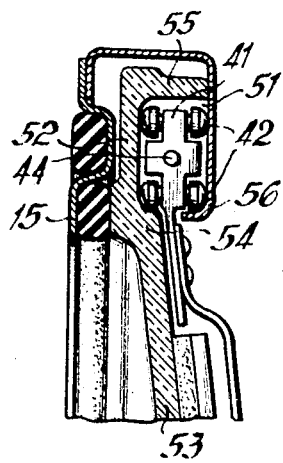
FIG. 4 is a fragmentary transverse vertical sectional view of a third light which constitutes a modification of the light shown in FIG. 3.

FIG. 4 illustrates a portion of a headlight which constitutes a modification of the structure shown in FIG. 3. The carriage 41 of the wiper is reciprocable in an elongated compartment 51 which is bounded by a flat marginal portion 52 of the lens 53, by two guide ribs 54, 55 which form integral parts of the marginal portion 52, and a shell 56 of sheet metal which is affixed to the rim 13. The rolls 42 of the carriage 41 are guided by one or more of the parts 52–55 when the carriage is caused to reciprocate in the compartment 51. It is clear that this carriage can be reciprocated by a drive wherein the drawstring 44 is replaced by an endless belt or the like. The parts 52, 54, 55, 56 together constitute a guide means or frame which replaces the frame 43 of FIG. 3.

Figure 5:
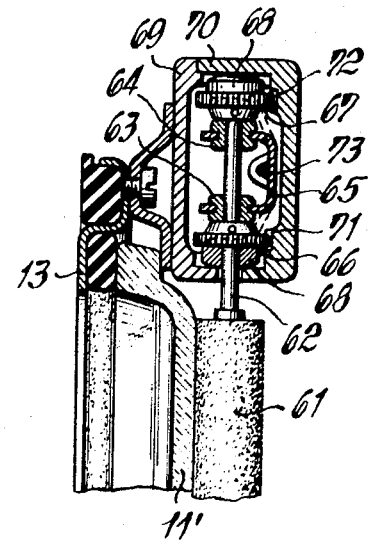
FIG. 5 is a similar fragmentary transverse vertical sectional view of a fourth light wherein the wiper comprises a rotary and reciprocable wiping element.

FIG. 5 illustrates a portion of a fourth headlight. In this embodiment of my invention, the wiping element 61 is an elongated brush which is rotatable about its own axis and is also reciprocable along the outer side of the lens 11. The shaft or stem 62 of the brush 61 is rotatable in two bearings 63, 64 which form part of a reciprocable carriage 65. The shaft 62 carries two pinions 66, 67 which mesh with elongated toothed racks 71, 72 provided on a shell 70 which, together with a shell 69, forms a guide means or frame for the carriage 65. The shell 69 is secured to the rim 13 by screws or analogous fasteners. The carriage 65 has two pairs of coaxial rolls 68 which are rotatable about two vertical axes parallel to the axis of the shaft 62. One pair of rolls 68 is located in front and the other pair of such rolls is located behind the shaft 62, as considered in the longitudinal direction of the frame 69, 70.

The drive means for the carriage 65 comprises a manually operated drawstring 73 which is preferably mounted in the same way as described for the drawstring 44 of FIG. 3. When the drawstring 73 moves lengthwise, either in response to a pull exerted by the operator's hand or in response to dissipation of energy by a locating spring corresponding to the spring 49 of FIG. 3, the carriage 65 travels back and forth in the compartment defined by the shells 69, 70 and the pinions 66, 67 respectively mesh with the racks 71, 72 to rotate the shaft 62 and the bristles of the brush 61. The bristles of the brush 61 are preferably arranged along one or more helices and their lead is preferably such that dust, mud or other foreign matter which is removed from the outer side of the lens 11 is compelled to move downwardly.

The wiper of FIG. 5 is of advantage for use in headlights whose lenses have outer sides provided with grooves, channels or analogous depressions which can be readily cleaned by revolving bristles of the brush 61. The cleaning action of such bristles can be enchanced if the assembly of FIG. 5 further comprises one or more nozzles or analogous devices which sprinkle water or other cleaning liquid onto the outer side of the lens 11, either before or after the carriage 65 is set in motion. For example, sprays of water under pressure can be discharged through the orifice or orifices of one or more stationary nozzles mounted on the lower edge portion of the rim 13 or such liquid may be admitted through the interior of a hollow shaft which replaces the shaft 62 of FIG. 5. Also, the nozzle or nozzles can be arranged to share reciprocatory movements of the carriage 65. A sprinkler which can be used in the headlight of the present invention will be described in connection with FIGS. 7 to 11.

Figure 6:
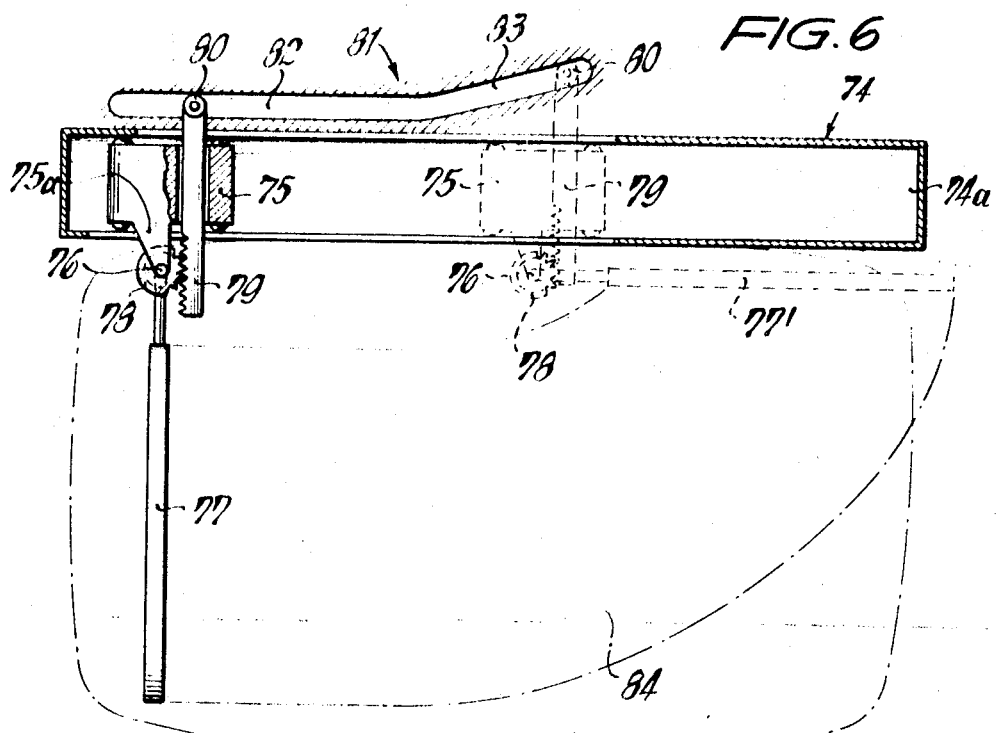
FIG. 6 is a fragmentary schematic front elevational view of a fifth light wherein the wiping element of the wiper is pivotable to and from parking position.

Referring now to FIG. 6, there is shown a further headlight wherein the wiper comprises a wiping element 77 which is reciprocable along the front side or outer side of a lens 85 (indicated by phantom lines) and is pivotable with reference to its carriage 75 to assume a second end position or parking position 77' in which it is adjacent to the horizontal upper edge portion of the lens 85. In the parking position 77', the wiping element is adjacent to the underside of an elongated guide means or frame 74 for the carriage 75. The latter has a downwardly projecting extension or arm 75a for a horizontal pivot member 76 which supports the upper end portion of the wiping element 77. The pivot member 76 is rigid with the wiping element 77 and with a pinion 78 which meshes with a vertically reciprocable rack 79 mounted in the carriage 75 in such a way that it shares the reciprocatory movements of the carriage. The upper end of the rack 79 carries a roller follower 80 which extends into a specially configurated groove or slot of a cam 81. This cam 81 is shown adjacent to the frame 74; however, it is normally preferred to provide the cam 81 in the inner or rear side wall 74a of the frame 74. This frame 74 preferably consists of two interconnected shells.

The groove of the cam 81 has a straight section 82 which is parallel to the frame 74 and an upwardly inclined section 83 which guides the roller follower 80 when the carriage 75 travels toward its second or right-hand end position. As will be readily understood by looking at FIG. 6, the pinion 78 is caused to turn the wiping element 77 about the axis of the pivot member 76 when the roller follower 80 travels in the section 83 of the cam groove whereby the element 77 turns through approximately 90° to assume a horizontal parking position 77' when the follower 80 enters the topmost part of the section 83 and to assume a substantially vertical position when the follower 80 enters the horizontal section 82. The field 84 which is wiped by the element 77 during movement between the two end positions is indicated by phantom lines. It will be noted that the wiping element 77 does not reach the lower right-hand corner on the outer side of the lens 85; however, this is of little importance in many instances so that the arrangement of FIG. 6 is quite capable of performing a highly satisfactory cleaning action.

The moulding ring (not shown in FIG. 6) is preferably designed in such a way that it fully conceals the wiping element 77 when the latter reaches the parking position 77'.

FIGS. 7 to 11 illustrate all details of a further headlight which is provided with a vertically reciprocable wiper 111 and with a sprinkler for spraying water or other liquid onto the outer side of the lens 112. The rim 112a for the lens 112 is mounted directly in the frame or chassis 113 of an automotive vehicle. The wiping element 114 of the wiper 111 is mounted on a wiper arm 115 of variable length. In response to changes in the length of the arm 115, the wiping element 114 moves up and down between two vertically spaced end positions. The wiping element 114 comprises an elastic lip 116 of rubber or the like which has a reinforced portion 117 fixedly received in a horizontal rail 118 of U-shaped cross-sectional outline (see FIG. 9). The rail 118 is pivotable on a horizontal pivot member 119 provided at the upper end of a holder 120 when lower end carries a second horizontal pivot member 121 secured to the innermost section 122 of the extensible and contractable wiper arm 115. A resilient element 123, here shown as a helical spring, operates between the holder 120 and arm section 122 and tends to pivot the holder 120 about the pivot member 121 in a clockwise direction as the parts appear in FIG. 9. In this way, the lip 116 has a tendency to bear against the outer side of the lens 112.

The wiper arm 115 further comprises a fixed outermost section or sleeve 126 which is fixedly inserted into a tubular guide means 127 forming part of a gear box or housing 128. The guide means 127 is affixed to the bumper 129 of the vehicle by means of a nut 130 (see particularly FIG. 7). The nut 130 urges a collar of the guide means 127 against the underside of the upper flange of the bumper 129 and thereby provides a rigid connection between the bumper and the gear case 128.

The latter carries the housing of a reversible direct-current electric motor 131 which is energizable by permanent magnet means and serves as a part of the drive means for the wiper 111. As clearly shown in FIG. 7, the gear case 128 and the motor 131 are substantially concealed behind and are thus protected by the bumper 129.

The gear case 128 accommodates a horizontal output shaft 134 which carries a pulley or sheave 135 (see FIG. 10). The latter is connected to one end of a flexible driving member 136 here shown as a cable which is capable of transmitting a pull as well as a push to the innermost section 122 of the wiper arm 115. The shaft 134 further carries a gear 137 which meshes with a gear 138 coaxially secured to a gear 139 meshing with a gear 140 on the output shaft 141 of the motor 131. The gears 137, 138, 139, 140 are accommodated in a casing or housing 142 which is screwed or bolted to the gear box 128. The bottom wall 143 of the casing 142 serves as a support for certain component parts of the motor 131. It also carries a protective shield or cap 144 best shown in FIG. 10. Thus, the parts 143, 144 together constitute a housing for the motor 131. The shaft 134 extends from the gear box 128 (FIG. 8) and drives a pulley in the gear box for the wiper in the other headlight (not shown).

The motor 131 drives the pulley 135 by way of the aforedescribed transmission including the gears 140, 139, 138, 137 in such a way that the pulley turns back and forth through a little less than one full revolution. The means for causing such oscillatory movements of the pulley 135 comprises two elastically deformable actuating posts 151, 152 (FIG. 9) which cooperate with a switching member 153 for a two-pole reversing switch 154 mounted on a plate 155. The posts 151, 152 are mounted on the pulley 135 and the plate 155 is affixed to the gear box 128. The reversing switch 154 is connected in the motor circuit and reverses the motor 131 after the pulley 135 turns through an angle of approximately 300°, either in a clockwise or in a counterclockwise direction. This is achieved in response to engagement between the switching member 153 and one of the posts 151, 152. The pulley 135 transmits to the cable 136 a lengthwise movement which is communicated to the innermost section 122 of the wiper arm 115. The gear box 128 accommodates a set of angularly spaced guide rolls 157 which are adjacent to the periphery of the pulley 135 and serve to hold the cable 136 in an endless groove provided therefor in the periphery of the pulley. Moreover, the rolls 157 insure that the angular movement of the pulley 135 is converted into reciprocatory movement of the cable 136 and section 122 with a minimum of friction.

The arrangement of FIGS. 7 to 11 further comprises a disengaging device which automatically disengages the lip 116 from the outer side of the lens 112 when the lip approaches its lower end position. This is indicated in FIG. 7 by phantom lines. Such disengagement is desirable in order to avoid contact between the lip 116 and the lower part of the metallic moulding ring (not shown). The disengaging device comprises two roller followers 162 which are mounted on a bifurcated extension 161 of the holder 120 at a level below the pivot member 121 and can engage a stationary cam 163 which is mounted on a stationary support 164 of sheet metal or the like. The arrangement is such that the followers 162 engage the cam 163 shortly before the lip 116 reaches its lower end position whereby the holder 120 is pivoted about the pivot member 121 against the opposition of the spring 123 so as to move the lip 116 away from the outer side of the lens 112. The aforementioned support 164 is secured to the bumper 129 by means of the aforementioned nut 130. The configuration of the cam 163 is preferably such that it maintains the wiper 111 in a lower end position or parking position in which the lip 116 is fully or nearly fully concealed behind the support 164 (see FIG. 7).

As stated before, the light of FIGS. 7 to 11 is further provided with a sprinkler which can spray water or other liquid onto the outer side of the lens 112. The sprinkler includes a pump (not shown) which feeds liquid through a supply conduit 165 to one or more nozzles 166 (FIGS. 7 and 8) mounted on the support 164 and having orifices arranged to spray liquid upwardly against the outer side of the lens 112. The operation of the pump in the sprinkler is synchronized with operation of the wiper 111 by synchronizing elements which are installed in the gear box 128. In this way, the pump feeds liquid in automatic response to reciprocation of the lip 116.

As shown in FIG. 9, the pulley 135 carries two pawls 167, 168 which extend in opposite directions and are biased by suitable springs (not shown) against fixed stop pins 169. The pallets of the pawls 167, 168 cooperate with an indexible wheel 170 (here shown as a ratchet wheel) which is rotatable on a shaft 171 carried by the plate 155. The arrangement is such that the pawl 167 indexes the wheel 170 by a step when the pulley 135 advances the wiper 111 upwardly and that the pawl 168 indexes the wheel 170 by a step when the pulley 135 causes the wiper 111 to move downwardly. The wheel 170 is rigid with two disk-shaped cams 172, 173 which respectively actuate programming switches 174, 175.

The electric programming circuit for the motor 131 and the sprinkler is shown in FIG. 11. The motor 131 has a rotary armature 176 whose brushes are respectively connected with the movable contacts 177, 178 of the aforementioned reversing switch 174. The movable contact 177 can engage with one of two fixed contacts 179, 180 and the movable contact 178 can be moved into engagement with one of fixed contacts 181, 182 in the reversing switch 154. The positive pole of a battery or other suitable source 183 of direct current is connected with the fixed contact 179 by a conductor 184. Conductors 185, 186 connect the conductor 184 with the fixed contact 182. The conductors 184-186 further connect the positive pole of the energy source 183 with two fixed contacts 187, 188 of a manually operated starter switch or master switch 189 having a movable contact 190 which can engage the fixed contacts 187, 188 or a second pair of fixed contacts 191, 192. The contacts 180, 181 are connected to the negative pole of the energy source 183 by a conductor 193.

A conductor 194 branches off the conductor 185 and is connectable by the switch 174 with the armature 195 of a direct-current motor which drives the aforementioned pump of the sprinkler. The armature 195 is further connected to the negative pole of the energy source 183. A further conductor 196 connects the fixed contact 192 of the starter switch 189 with the movable contact 197 of the switch 175. The movable contact 177 can engage one of two fixed contacts 198, 199 in the switch 175. The fixed contact 198 is connected with the positive pole of the energy source 183 by way of conductors 185, 184. The contact 199 is connected directly to the negative pole of the energy source.

The starter switch 189 is shown in an idle position in which it completes a braking circuit for the armature 176 of the motor 131. This braking circuit includes one brush of the armature 176, movable contact 178, fixed contact 182, fixed contact 191, movable contact 190, fixed contact 192, conductor 196, movable contact 197, fixed contact 199, conductor 193, fixed contact 180, movable contact 177 and the other brush of the armature 176.

In order to start the motor 131, the driver of the vehicle closes the starter switch 189 for a short interval of time. This interrupts the aforementioned braking circuit and completes the motor circuit form the positive pole of the energy source 183, through the conductors 184, 185, contacts 188, 190, 187, conductor 186, contacts 182, 178, armature 176, contacts 177, 180, and conductor 193 to the negative pole of the energy source. The motor 131 is started and drives the lip 116 upwardly. The wheel 170 is indexed by the pawl 167 so that it turns the cams 172, 173. This closes the switch 174 and the contact 197 of the switch 175 is caused to engage the contact 198. The switch 174 completes the circuit of the armature 195 so that the motor which includes this armature drives the aforementioned pump which delivers water to the nozzles 166 so that the nozzles spray water onto the outer side of the lens 112. The switch 175 connects the energy source 183 with the contact 192 of the switch 189 by way of conductors 184, 185, contacts 198, 197 and conductor 196. When the operator releases the movable contact 190 of the switch 189, the contact 190 engages the contacts 191, 192 and completes the motor circuit by way of the switches 175, 189, contacts 182, 178, armature 176, contact 177, and contact 180. Thus, the circuit of the motor 131 remains completed, even though the contact 190 of the switch 189 is released by the driver's finger, until the movable contact 197 of the switch 175 returns to the position shown in FIG. 11.

When the lip 116 reaches the upper end position shown in FIG. 7 by solid lines, the post 151 on the pulley 135 engages the switching member 153 and changes the position of the movable contacts 177, 178 in the reversing switch 154. The contacts 177, 178 then respectively engage the fixed contacts 179, 181. The motor 131 is caused to drive the lip 116 downwardly until the post 152 engages the switching member 153 and causes the switch 154 to return to the position shown in FIG. 11. This take place when the lip 116 reaches the lower end position or parking position.

The wheel 170 is indexed by the pawl 167 or 168 by a step whenever the lip 116 moves upwardly or downwardly. The configuration of the cam 172 is such that the switch 174 opens in response to each second downward movement of the lip 116 so that the motor including the armature 195 is then arrested and the sprinkler ceases to deliver liquid to the nozzles 166. The cam 173 opens the switch 175 in response to each fourth downward movement of the lip 116. When the lip 116 moves downwardly, the movable contacts 177, 178 of the reversing switch engage the fixed contacts 179, 181; therefore, opening of the switch 175 does not interrupt the circuit of the motor 131 until the post 152 changes the position of contacts 177, 178 when it engages the switching member 153 in the lower end position of the lip 116. This opens the circuit of the motor 131 and the lip 116 remains in the parking position. The aforementioned braking circuit for the motor 131 is then completed. It will be seen that the reversing switch 174 cooperates with the switch 175 to automatically locate the lip 116 in parking position when the circuit of the motor 131 is interrupted. This is achieved without resorting to special limit switches.

An important advantage of the construction shown in FIGS. 7–10 is that the guide 127 extends substantially at right angles to the adjoining lower edge portion of the lens 112 and substantially radially of the lens. Therefore, the major part of the guide 127 can be readily concealed and occupies very little room. Also, the guide 127 can be mounted at any convenient point adjacent to the light, and such mounting can be carried out subsequent to installation of the light. Due to the fact that the guide 127 is mounted behind the bumper 129, it occupies only such space which is available anyway in a vehicle. In addition, the guide is fully protected by the bumper. However, it is clear that such guide can be mounted with equal advantage on another part of the chassis.

The pulley 135 can be rotated back and forth by a non-reversible motor by way of a crank arm or the like.

Referring finally to FIGS. 12 to 14, there is shown a portion of a further headlight. The wiping element 114 is mounted on a holder 120 which is pivotally attached to the upper end of a push rod 201. The latter is connected to a carriage 202 which is reciprocable up and down in a vertical box-like frame or guide means 203. The carriage 202 has four rolls 204 whose diameters are slightly smaller than the corresponding dimension of the frame 203 so that the carriage is free to move up and down with minimal friction. A link or coupling member 205 is articulately connected to the carriage 202 and to an endless flexible driving element or belt 206 which is trained around rollers 207, 208 mounted in the frame 203. The roller 208 is connected with the output shaft of a motor 209 which drives the endless driving element 206 in a predetermined direction whereby the link 205 either pushes or pulls the carriage 202 in the frame 203. The upper end portion of the link 205 either pushes or pulls the carriage 202 in the frame 203. The upper end portion of the link 205 travels along an arcuate path during movement around the roller 207 or 208. The frame 203 is secured to and is protected by the bumper 129.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

I claim:

1. In a light for use in automotive vehicles, a combination comprising a lens having an outer side and an edge portion; a wiper including an elongated wiping element adjacent to the outer side of said lens and movable back and forth between a first end position and a second position adjacent to said edge portion whereby said wiping element sweeps at least a substantial part of said outer side; drive means operative to move said wiping element between said end positions, comprising a flexible driving member extending substantially at right angles to and operatively connected with said wiping element to push or pull said wiping element, and guide means for said driving member, said wiper further comprising an arm having a plurality of telescoped sections one of which is connected with said wiping element and with said driving member; frame means for supporting said guide means independently of said lens; and locating means for automatically maintaining said wiping element in said second end portion when said drive means is idle.

2. A combination as defined in claim 1, further comprising a housing, said drive means further comprising a pulley rotatably mounted in said housing and connected with one end of said flexible driving member.

3. A combination as defined in claim 1, wherein said wiper further comprises a holder connected with said wiping element, pivot means connecting said holder with said flexible driving member and resilient means operating between said holder and said driving member to bias said wiping element against the outer side of said lens.

4. A combination as defined in claim 3, further comprising pivot means articulately connecting said wiping element to said holder.

5. A combination as defined in claim 1, wherein said drive means further comprises a pulley rotatable about a fixed axis and connected with one end of said flexible driving member, and motor means for rotating said pulley in clockwise and counterclockwise directions to thereby reciprocate said wiping element along the outer side of said lens.

6. A combination as defined in claim 5, further comprising programming means for said motor means, said programming means comprising a portion provided on said pulley.

7. A combination as defined in claim 1, wherein at least a portion of said guide means is mounted behind the bumper of the vehicle in which said light is installed.

8. A combination as defined in claim 1, wherein said wiping element is reciprocable along the outer side of said lens between said first and second end positions thereof, and further comprising disengaging means for moving said wiping element away from the outer side of said lens when the wiping element approaches said second end position.

9. A combination as defined in claim 1, further comprising sprinkler means operative to spray a liquid onto the outer side of said lens.

10. A combination as defined in claim 9, further comprising programming means for controlling the operation of said sprinkler means and said drive means.

* * * * *